(12) United States Patent
Salaun et al.

(10) Patent No.: US 9,143,352 B2
(45) Date of Patent: Sep. 22, 2015

(54) METHOD AND DEVICE FOR MONITORING SERVICE QUALITY IN A NETWORK

(75) Inventors: Mikaël Salaun, Rosnoen (FR); Michael Kleis, Berlin (DE); Benoît Radier, Perros Guirec (FR)

(73) Assignee: Orange, Paris (FR)

( * ) Notice: Subject to any disclaimer, the term of this patent is extended or adjusted under 35 U.S.C. 154(b) by 235 days.

(21) Appl. No.: 12/918,181

(22) PCT Filed: Feb. 9, 2009

(86) PCT No.: PCT/FR2009/050199
§ 371 (c)(1),
(2), (4) Date: Nov. 15, 2010

(87) PCT Pub. No.: WO2009/103919
PCT Pub. Date: Aug. 27, 2009

(65) Prior Publication Data
US 2011/0205896 A1     Aug. 25, 2011

(30) Foreign Application Priority Data
Feb. 20, 2008  (FR) .................................... 08 51098

(51) Int. Cl.
*H04L 12/26* (2006.01)
*H04L 12/54* (2013.01)
*H04L 12/911* (2013.01)
*H04L 12/927* (2013.01)
*H04L 29/08* (2006.01)
*H04L 29/06* (2006.01)

(52) U.S. Cl.
CPC .......... *H04L 12/5695* (2013.01); *H04L 47/748* (2013.01); *H04L 47/805* (2013.01); *H04L 47/829* (2013.01); *H04L 67/322* (2013.01); *H04L 69/24* (2013.01)

(58) Field of Classification Search
USPC ......... 370/231, 212, 211, 200, 262, 254, 230; 709/232, 239
See application file for complete search history.

(56) References Cited

U.S. PATENT DOCUMENTS

| | | | |
|---|---|---|---|
| 2001/0026553 A1 | 10/2001 | Gallant et al. | |
| 2004/0202159 A1* | 10/2004 | Matsubara et al. | 370/389 |
| 2005/0053003 A1* | 3/2005 | Cain et al. | 370/235 |
| 2007/0025243 A1* | 2/2007 | Ayyagari et al. | 370/229 |
| 2008/0049631 A1* | 2/2008 | Morrill | 370/250 |
| 2008/0186925 A1* | 8/2008 | Cheng et al. | 370/338 |
| 2010/0278069 A1* | 11/2010 | Sharma et al. | 370/254 |

FOREIGN PATENT DOCUMENTS

| | | |
|---|---|---|
| EP | 1 404 081 | 3/2004 |
| EP | 1404081 A1 * | 3/2004 |
| EP | 1 874 019 | 1/2008 |

* cited by examiner

*Primary Examiner* — Andrew Lai
*Assistant Examiner* — Jamaal Henson
(74) *Attorney, Agent, or Firm* — Knobbe Martens Olson & Bear LLP

(57) ABSTRACT

A method of monitoring the end-to-end quality of a service in a telecommunications network includes: a step (F10) of negotiating with the provider of the service a contract including at least one quality parameter of said service; a step (F22) of determining functions that must be provided by the network to comply with said contract; a step (F30) of receiving a request from a terminal to access said service; a step (F40) of selecting, on reception of the request, at least one equipment of the network able to provide said functions; and a step (F50) of setting up a path in the network between the terminal and the service provider via said at least one equipment.

21 Claims, 2 Drawing Sheets

METHOD AND DEVICE FOR MONITORING SERVICE QUALITY IN A NETWORK

RELATED APPLICATIONS

This is a U.S. National Phase Application under 35 USC §371 of International Application PCT/FR2009/050199, filed on Feb. 9, 2009.

This application claims the priority of French application no. 08/51098 filed on Feb. 20, 2008, the content of which is hereby incorporated by reference.

BACKGROUND OF THE INVENTION

The invention relates to the general field of monitoring quality of service in a telecommunications network.

It is preferably applied, although this is not limiting on the invention, in heterogeneous networks in which terminals of different types access multimedia services via access networks of different types.

In the current state of the art, the parameters of the quality of service offered to a user are managed by the service provider, the role of the network operator consisting essentially in transporting the multimedia data stream between the service provider and the terminal of the user.

Of course, in this patent application, the expression "service provider" refers to the information technology equipment of the service provider and not the commercial enterprise that offers the service.

FIG. 1 shows this mechanism. This figure shows a terminal 10 in a telecommunications network 1 seeking to download a multimedia stream from a content server 50 of a service provider.

In this example as described here, the terminal 10 accesses the network 1 via a home gateway 11 to which it is connected by a WiFi connection.

The home gateway 11 communicates with routers 13 of the network 1 via a DSLAM 12.

The DSLAM 12 is a known device adapted to recover data streams in transit on telephone lines to which it is connected and to multiplex this data to redirect it to the network of the operator.

It is assumed that on the service provider side the content server 50 is behind a transcoder 52 that adapts the format of the multimedia stream as a function of the characteristics of the terminal 10 and its access network.

In the example described here, the multimedia stream is secured by a firewall 51.

In the current state of the art, the equipment chain shown in FIG. 1 is set up statically by the operator when the user of the terminal 10 subscribes to the service concerned.

For example, if the user subscribes to a video on-demand Internet service, the operator sets up statically a chain in which:

- the connection between the home gateway 11 and the DSLAM 12 includes virtual channels VC;
- the routers 13 are statically predefined in a routing table of the operator; and
- the firewall 51 and the transcoder 52 are chosen to make the multimedia stream secure and to code it as a function of the characteristics of the user terminal (set-top box) 10 and the access network (WiFi, ADSL).

From the point of view of the operator this configuration is very costly and it is not possible to optimize it as a function of the real demand from users.

Moreover, in practice it obliges the service provider to provide a content dedicated to each type of user equipment and each type of wireless access network (GPRS, UMTS, WiFi, etc.) or cable access network (ADSL, FTTH, etc.).

OBJECT AND BRIEF SUMMARY OF THE INVENTION

The present invention enables monitoring of the end-to-end quality of a service in a telecommunications network free of the drawbacks of the prior art.

Thus a first aspect of the invention provides a method of monitoring end-to-end quality of service in a telecommunications network, this method including:

- a step of negotiating with the provider of the service a contract including at least one quality parameter of said service;
- a step of determining functions that must be provided by the network to comply with said contract;
- a step of receiving a request from a terminal to access said service;
- a step of selecting, on reception of the request, at least one equipment of the network able to provide the above-mentioned functions; and
- a step of setting up a path in the network between the terminal and the service provider via the selected equipment(s).

In a correlated way, the invention provides a device for monitoring the end-to-end quality of service in a telecommunications network. This device includes:

- means for negotiating with a service provider a contract including at least one quality parameter of the service;
- means for determining functions that must be provided by the network to comply with said contract;
- means for receiving a request from a terminal to access said service;
- means for selecting, on reception of the request, at least one equipment of the network able to provide the above-mentioned functions; and
- means for setting up a path in the network between the terminal and the service provider via the selected equipment(s).

Thus, generally speaking, one aspect of the invention provides a method of monitoring the quality of a service in which the equipment chain involved in transporting the data stream is set up dynamically, on demand, as a function of quality of service parameters negotiated beforehand with the service provider, which is highly advantageous.

During the negotiation step, the service provider and the device of the invention draw up a contract that defines the quality of service parameters that must be used in a particular context, for example for a given type of terminal and a given type of access network.

The quality of service parameters may in particular be chosen as a function of at least one characteristic:

- of the service access terminal;
- of an access network from the terminal to the telecommunications network; and
- of a protocol for coding a data stream to be transported between the access terminal and the service provider.

After the contract is negotiated, the device of the invention determines the functions that must be implemented by the network to comply with the contract.

Those functions can in particular be chosen from a function for transcoding a data stream to be transported between the access terminal and the service provider, a function for securing the data stream, and a function for routing the data stream.

A list of these functions may be stored in an associated file, for example, in a database, with an identifier of the contract to which it relates.

According to an embodiment of the invention, at this stage the device of the invention does not define the network equipments to be used to respond to a request sent by a terminal to access the service.

To the contrary, according to an embodiment of the invention, the equipment chain able to implement all the required functions is determined dynamically by the device of the invention on reception of an access request.

When the equipments have been selected, the device according to an embodiment of the invention configures them to set up a path over which the operator may transport the multimedia stream to the user terminal via them, the quality of service conforming to the terms of the contract previously negotiated with the service provider.

In one particular embodiment of the invention, the telecommunications network is a hybrid pair network and the monitoring device of the invention is a superpair of that network.

In this embodiment, this device selects pairs of the network able to implement the functions necessary for correct execution of the contract.

Thus it may in particular use an election mechanism to select in the hybrid pair network pairs able to implement a routing function, a stream securing function, and a stream transcoding function.

A second aspect of the invention provides a server that may be used as a content server of the invention.

This server includes:
means for receiving from a terminal a request to access a service;
means for identifying in a database the address of a device of the network as a function of an identifier of the service and a contract including at least one quality parameter of the service; and
means for redirection from the terminal to the device.

This aspect of the invention offers the service provider great flexibility because, from the point of view of the service provider, it suffices to negotiate the contract with the operator of the telecommunications network and to redirect requests to the client determined in this way to a device of the operator able to choose the appropriate network equipments to execute the contract.

In a correlated way, another aspect of the invention provides a method of implementing a service, said method comprising:
a step of receiving from a terminal a request to access a service;
a step of identifying in a database the address of a superpair of the network as a function of an identifier of the service and a contract including at least one quality parameter of the service; and
a step of redirection from the terminal to the superpair.

In one particular implementation, the steps of the method of monitoring quality of service and/or the method of implementing a service are determined by computer program instructions.

Consequently, another aspect of the invention also provides a computer program on an information medium, which program may be used in a quality monitoring device or more generally in a computer and includes instructions adapted to execute the steps of the above method of monitoring quality.

Another aspect of the invention provides a computer program on an information medium, which program may be used in a server or more generally a computer and includes instructions adapted to execute the steps of the above method of providing a service.

These programs may use any programming language and take the form of source code, object code, or a code intermediate between source code and object code, such as a partially-compiled form, or any other desirable form.

Another aspect of the invention provides a computer-readable information medium containing instructions of the above computer program.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention may in particular be downloaded over an Internet-type network.

Alternatively, the information medium may be an integrated circuit in which the program is incorporated, the circuit being adapted to execute the method in question or to be used in its execution.

DETAILED DESCRIPTION OF THE DRAWINGS

Figure 2B:
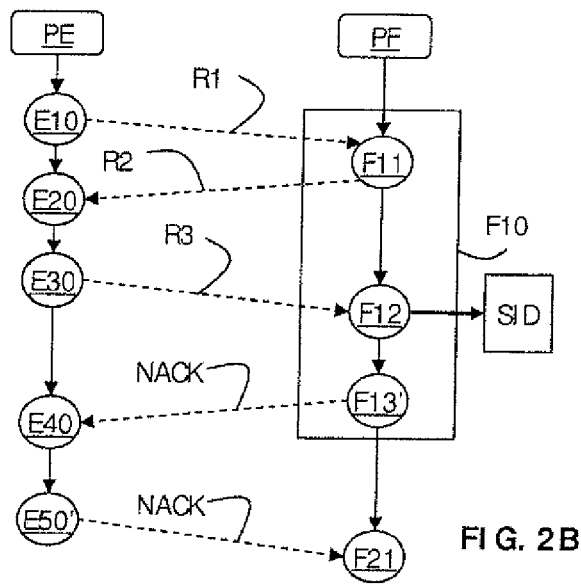
FIGS. 2A and 2B show diagrammatically steps of a method of monitoring quality of service and steps of a method of providing a service in one particular implementation of the invention.
Figure 2A:
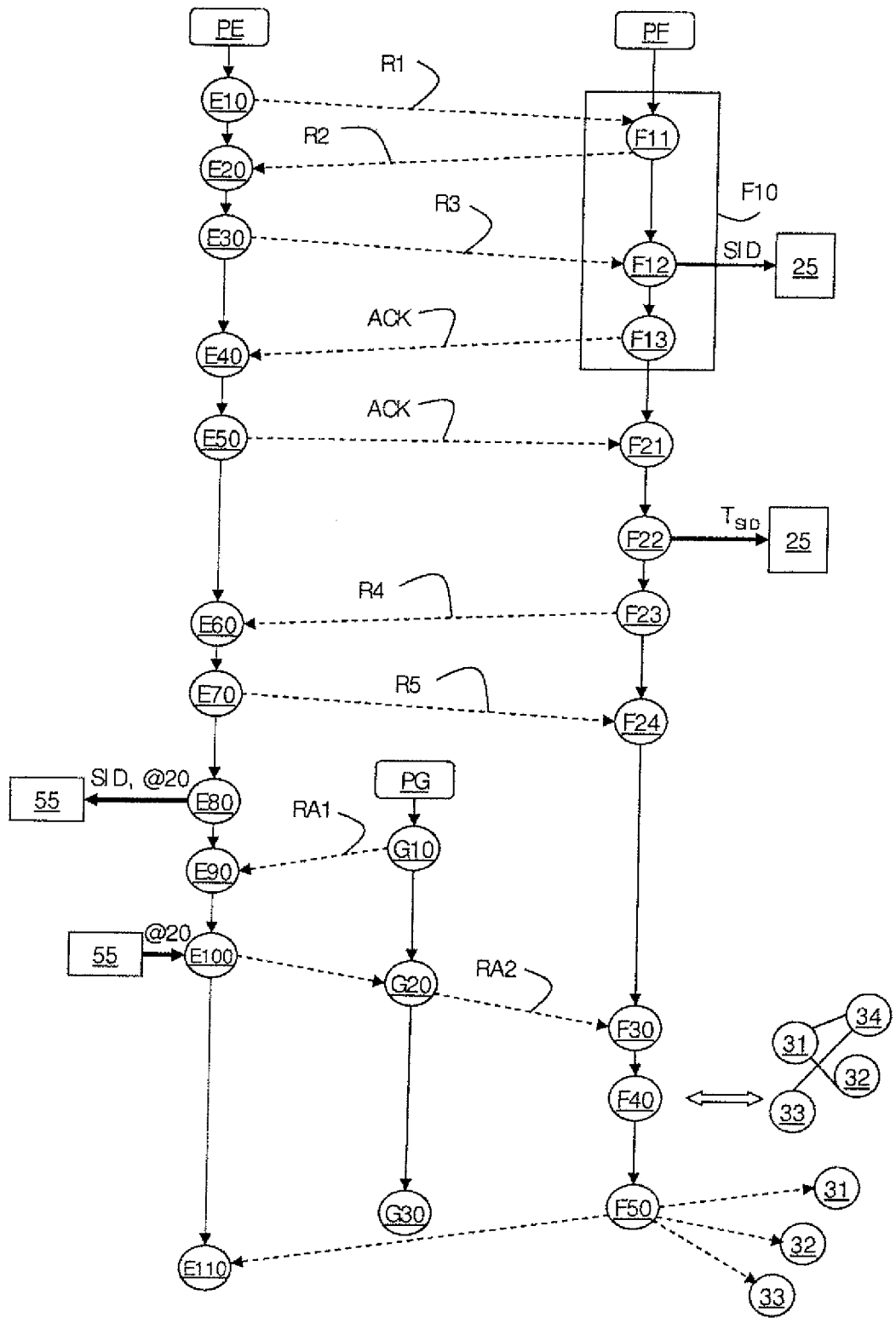

FIG. 2A illustrates diagrammatically the steps of a method of monitoring quality of service in a telecommunications network (below referred to as "method PF") in one particular implementation of the invention and steps of a method of providing a service (below referred to as "method PE") in that particular implementation of the invention.

In the implementation of the invention described here, each of these methods is implemented by a computer program.

In FIG. 2A, a computer program PF of the invention executes the steps of a method of the invention for monitoring quality of service when it is executed by a computer.

A computer program PE includes instructions for executing the steps of a method of the invention for providing a service when the program is executed by a computer.

The method of the invention for monitoring quality of service and the method of the invention for providing a service are respectively executed by a monitoring device 20 and a server 50 that are described below with reference to FIGS. 4 and 5.

Figure 4:
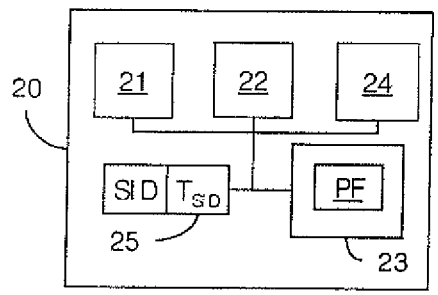
FIGS. 4 and 5 respectively show a device for monitoring quality of service and a server of one particular embodiment of the invention.

FIG. 4 represents diagrammatically a device 20 for monitoring quality of service in one particular embodiment of the invention.

In the example described here, this monitoring device 20 has the hardware architecture of a computer.

It includes a processor 21, a random-access memory (RAM) 22, and a read-only memory 23 storing the computer program PF represented in FIG. 2A.

The random-access memory 22 includes registers for execution of the computer program PF by the processor 21.

The monitoring device 20 of the invention also includes communications means 24.

In the embodiment of the invention described here, the monitoring device 20 of the invention includes a non-volatile rewritable flash memory 25.

In that memory the monitoring device 20 of the invention stores at least an identifier SID of a contract negotiated with the server 50 of the invention and a file $T_{SID}$ containing the functions that must be provided by the network to comply with the contract SID.

Figure 5:
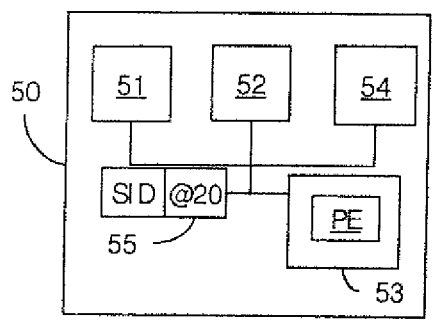

Referring to FIG. 5, in this particular embodiment of the invention the server 50 of the invention has the hardware architecture of a computer.

This server 50 includes a processor 51, a random-access memory (RAM) 52, and a read-only memory (ROM) 53 storing the computer program PE represented in FIG. 2A.

The random-access memory 52 includes registers enabling execution of the computer program PE by the processor 51.

The server 50 includes communications means 54.

In the implementation of the invention described here, the server 50 includes a database 55 storing the identifier of a contract negotiated with the monitoring device 20 of the invention in association with the network address @20 of that device.

In the implementation of the invention shown in FIG. 2A, the method PE includes a step E10 during which the server 50 of the service provider sends a request R1 to the monitoring device 20 of the invention to initiate negotiation of a contract that has to define the characteristics of the transport service, or more generally of the network, providing the service.

This contract defines among other things the necessary quality of service parameters ("constraints") $C_{SID}$. These constraints may be chosen for example from an acceptable maximum cost for the service, parameters in terms of required loss rate, delay or bandwidth, etc.

In the implementation of the invention described here, the contract SID also includes a definition of functions $P_{SID}$ that the network must provide. These functions $P_{SID}$ may in particular provide security or transcoding services.

The contract SID may optionally also contain the set $S_{SID}$ of content servers used for the service.

The contract SID may optionally also contain the set $A_{SID}$ of gateways allowing access to the service.

The request R1 sent by the server 50 is received by the monitoring device 20 during a step F11 of the method PF.

During this step F11, the monitoring device 20 establishes a transport offer for providing said service, possibly associated with cost information.

This offer is sent to the server 50 in a response R2 received by said server 50 during a step E20 of the method PE.

During a step E30 of the method PE, the server 50 of the service provider selects a plurality of service components from the offer received. It sends a list of these service components to the monitoring device 20 in a message R3 received during a step F12 of the method PF.

In the FIG. 2A example it is assumed that the monitoring device 20 accepts to provide the components selected by the server 50, in other words that it accepts the terms of the contract negotiated with this server.

Under these conditions, during the step F12, the monitoring device 20 of the invention generates the identifier SID of this contract and stores it in its non-volatile rewritable memory 25.

Then, during a step F13, the monitoring device 20 of the invention sends a positive acknowledgement of reception ACK to the server 50, the server receiving this acknowledgement during a step E40 of the method PE.

The steps F11, F12, and F13 of the method PF constitute a step F10 of negotiation in the sense relevant to the invention.

In the implementation of the invention described here, the server 50 in turn sends the monitoring device 20 of the invention a positive acknowledgement message ACK during a step E50.

The device 20 receives this positive acknowledgement message ACK during a step F21.

According to the invention, after the negotiation of the contract SID, the monitoring device 20 determines the functions that must be provided by the network to comply with the contract SID during a step F22.

These functions are stored in a file $T_{SID}$ in the non-volatile rewritable memory 25 in association with the identifier of the contract SID.

In the implementation of the invention described here, the monitoring device 20 of the invention sends its address @20 to the server 50 during a step F23 of the method PF in a message R4 that the server 50 receives during a step E60 of the method PE.

In the implementation of the invention described here, the server 50 sends an acknowledgement message R5 during a step 70 of the method PE that the monitoring device 20 receives during a step F24.

Then, during a step E80, the server 50 stores in its database 50 the identifier SID of the contract in association with the address @20 of the monitoring device 20 of the invention.

FIG. 2A also shows a method PG that may be used by the terminal 10 of a user to access the service concerned.

As in the prior art, a user of the terminal 10 seeking to access a service sends an access request RA1 to the server 50 during a step G10 of the method PG.

It is assumed here that the server 50 receives this access request RA1 during a step E90 of the method PE.

According to the invention, on reception of the access request RA1, during a step E100 the server 50 identifies in its database 55 the address @20 of the monitoring device 20 with which it negotiated the contract SID to provide the service.

Then, during the same step E100, the server 50 sends the user terminal a request for redirection to the monitoring device 20 of the invention.

Consequently, the user terminal 10 sends a request RA2 to the monitoring device of the invention to access the service, the device 20 receiving this request during a step F30 of the method PF.

According to the invention, on reception of this request RA2, the monitoring device 20 of the invention selects during a step F40 network equipments able to provide the functions stored in the file $T_{SID}$.

It is assumed in this example that the necessary functions are a routing function, a securing function, and a transcoding function.

In the implementation of the invention described here, in which the telecommunications network is a pair network, the step F40 consists in identifying pairs of the network able to provide these functions and selecting them by means of an election process.

It is assumed in this example that the server 20 establishes that the pairs 31, 32, and 33 are respectively able to route the data stream, to secure the stream, and to transcode it.

Then during a step F50 the monitoring device 20 of the invention establishes a path in the telecommunications network between the user terminal and the server 50 via the chain of pairs 31, 32, 33.

To this end, the monitoring device 20 sends each of these equipments the characteristics of the function that it must provide and the identifier of the equipments in the chain with which it must communicate.

It is assumed that the server 50 receives the information that relates to it during a step E110 of the method PE.

Figure 1:
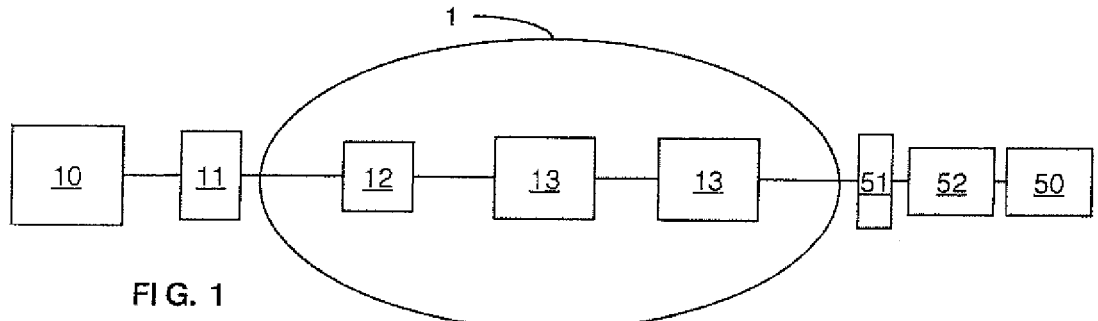
FIG. 1, described above, shows a prior art mechanism for monitoring end-to-end quality of service.
Figure 3:
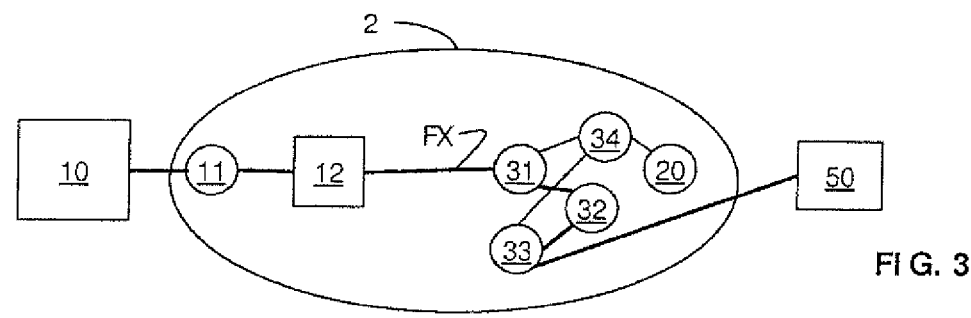
FIG. 3 shows an embodiment similar to that of FIG. 1 that is the result of the methods shown in FIG. 2A.

The path between the user terminal 10 and the content server 50 set up for the monitoring device 20 of the invention is represented in bold in FIG. 3.

This path includes:
a section between the DSLAM 12 and the pair 31 providing the routing function;
a section between the pair 31 and the pair 32 providing the securing function;
a section between the pair 32 and the pair 33 providing the transcoding function; and
a section between the pair 33 and the content server 50.

In FIG. 2A described above it is assumed that the monitoring device 20 would accept the service components received from the server 50 in the message R3.

The methods PE and PF are described below with reference to FIG. 2B in the situation where the monitoring device 20 refuses at least one of those components.

In this situation, after reception of the message R3 during the step F12, the monitoring device 20 of the invention sends a negative acknowledgement of reception NACK to the server 50 during a step F13', this message NACK being received during the step E40 of the method PE already described.

In the implementation of the invention described here, the server 50 in turns sends a negative acknowledgement message NACK to the monitoring device 20 of the invention during a step E50', this message being received during the step F21 of the method PF.

The invention claimed is:

1. A method of monitoring end-to-end quality of service provided by a server of a service provider in a telecommunications network, wherein the method is performed by a monitoring device of a network operator, said method comprising:
prior to the provision of service by the service provider:
negotiating by said monitoring device of said network operator over said telecommunications network with the server of the service provider, a contract including at least one quality parameter of said service; and
determining, by said monitoring device, functions that must be provided by the network to satisfy said contract;
then, after said negotiating and determining processes, in preparation for providing the service:
receiving, by said monitoring device, a request from a terminal to access said service;
selecting, by said monitoring device on reception of said request, at least one equipment of said network able to provide said functions; and
after selecting said at least one equipment of said network, setting up, by said monitoring device, a path in said network between said terminal and said server via said at least one equipment.

2. The monitoring method according to claim 1, wherein said at least one quality of service parameter is chosen as a function of at least one characteristic:
of said terminal;
of an access network from said terminal to said telecommunications network; and
of a protocol for coding a data stream to be transported between said terminal and said server.

3. The monitoring method according to claim 1, wherein said at least one function is chosen from the set comprising a data stream transcoding function, a data stream securing function, and a data stream routing function, said at least one function being intended to be applied to a data stream to be transported between said terminal and said server.

4. The monitoring method according to claim 1, wherein said process of negotiating a contract comprises:
receiving, from a server of said provider of said service, a request to initiate the negotiation of the contract, the request comprising characteristics of a transport service of the network to provide the service;
sending, to the server, a transport offer for providing the service, the transport offer comprising a plurality of service components available; and
receiving, from the server, a list of service components selected from amongst the plurality of service components available.

5. The monitoring method according to claim 4, wherein said process of negotiating a contract further comprises:
if the monitoring device accepts to provide the service components selected by the server,
generating an identifier of the contract,
storing the identifier, and
sending a positive acknowledgement of reception to a server of said provider of said service,
otherwise,
if the monitoring device does not accept to provide the service components selected by the server, sending a negative acknowledgement of reception to the server.

6. The monitoring method according to claim 1, wherein said process of determining functions that must be provided by the network to satisfy said contract is followed by a process of storing the functions in a file associated with an identifier of the contract.

7. The monitoring method according to claim 1, wherein said process of determining functions that must be provided by the network to satisfy said contract is followed by sending, by the monitoring device, of its address to a server of said provider of said service.

8. The monitoring method according to claim 1, wherein said process of setting up a path further comprises a step of sending, to each equipment, the characteristics of the function that it must provide and the identifier of the equipment in the chain with which it must communicate.

9. The monitoring method according to claim 1, wherein said process of setting up a path is followed by sending, to a server of said provider of said service, the information that relates to the server.

10. A non-transitory storage medium readable by a computer on which is stored a computer program including instructions for executing a method of monitoring end-to-end quality of service provided by a server of a service provider in a telecommunications network, wherein the method is performed by a monitoring device of a network operator, said method comprising:
prior to the provision of service by the service provider:
negotiating by said monitoring device of said network operator over said telecommunications network with the server of the service provider, a contract including at least one quality parameter of said service; and determining, by said monitoring device, functions that must be provided by the network to satisfy said contract;

then, after said negotiating and determining processes, in preparation for providing the service:

receiving, by said monitoring device, a request from a terminal to access said service;

selecting, by said monitoring device on reception of said request, at least one equipment of said network able to provide said functions; and after selecting said at least one equipment of said network, setting up, by said monitoring device, a path in said network between said terminal and said server via said at least one equipment.

11. A system for monitoring end-to-end quality of service provided by a server of a service provider in a telecommunications network, comprising:

a monitoring device of a network operator, said monitoring device being programmed to:

prior to the provision of service by the service provider:

negotiate over said telecommunications network with the server of the service provider, a contract including at least one quality parameter of said service, wherein said negation is conducted prior to the provision of service;

determine functions that must be provided by the network to satisfy said contract;

then, after said negotiation and determination, in preparation for providing the service to:

receive a request from a terminal to access said service;

select, on reception of said request, at least one equipment of said network able to provide said functions; and after selecting said at least one equipment of said network, set up a path in said network between said terminal and said server via said at least one equipment.

12. A monitoring device of a network operator for monitoring end-to-end quality of a service provided by a server of a service provider in a telecommunications network, the monitoring device comprising:

a processor; and a memory having stored thereon instructions which, when executed by a processor, perform the method of monitoring end-to-end quality of service according to claim 1;

wherein the processor is configured to, prior to the provision of service by said service provider:

facilitate negotiation, by said monitoring device of said network operator over said telecommunications network with the server of the service provider, a contract including at least one quality parameter of said service;

determine functions that must be provided by the network to comply with said contract;

wherein the monitoring device is configured to, in preparation for providing said service:

receive a request from a terminal to access said service over said communications network after said processor has negotiated said contract and has determined said functions; and select, on reception of said request, at least one equipment of said network able to provide said functions after said processor has negotiated said contract and has determined said functions;

the processor being further configured to, in preparation for providing said service, after selection of said at least one equipment of said network and after having negotiated said contract and has determined said functions, set up a path in said network between said terminal and said server via said at least one equipment.

13. The device according to claim 12, wherein said device is adapted to be used in a network comprising members with differing degrees of bandwidth.

14. A method of providing a service by a server of a service provider, the quality of which is monitored end-to-end by a monitoring device of a network operator, in a telecommunications network, said method comprising:

prior to the provision of service by said service provider, the step of:

negotiating, with the monitoring device of said network operator over said telecommunications network, a contract including at least one quality parameter of said service, wherein the functions that must be provided by the network to satisfy said contract are determined by the monitoring device;

then, after said negotiating process, in preparation for providing the service:

receiving a request from a terminal to access said service; and sending the request back to the terminal such that the terminal may send the request to the monitoring device, wherein on reception of said request, the monitoring device selects at least one equipment in said network able to provide said functions and, after selecting said at least one equipment of said network, sets up a path in said network between said terminal and said server via said at least one equipment.

15. The method of providing a monitored service according to claim 14, wherein said process of negotiating a contract comprises:

sending, to the monitoring device, a request to initiate the negotiation of the contract, the request comprising characteristics of a transport service of the network to provide the service;

receiving, from the monitoring device, a transport offer for providing the service, the transport offer comprising a plurality of service components available; and sending, to the monitoring device, a list of service components selected from amongst the plurality of service components available.

16. The method of providing a monitored service according to claim 15, wherein said process of negotiating a contract is followed by:

if the monitoring device accepts to provide the service components selected by the server, receiving a positive acknowledgement of reception from the monitoring device, otherwise, if the monitoring device does not accept to provide the service components selected by the server, receiving a negative acknowledgement of reception from the monitoring device.

17. The method of providing a monitored service according to claim 14, wherein said process of determining functions that must be provided by the network to satisfy said contract is followed by receiving, from the monitoring device, the address of the monitoring device.

18. The method of providing a monitored service according to claim 17, wherein said process of receiving the address of the monitoring device is followed by storing the identifier of the contract with the address of the monitoring device.

19. The method of providing a monitored service according to claim 14, wherein said process of sending a request from a terminal to access said service is preceded by:

receiving the access request from the terminal, identifying the address of the monitoring device with which is negotiated the contract to provide the service, and sending the terminal a request for redirection to the monitoring device.

20. The method of providing a monitored service according to claim 14, wherein said process of setting up a path in said network between said terminal and said server via said at least one equipment is followed by receiving, from the monitoring device, the information that relates to the server.

21. A server of a service provider for providing a service, the quality of which is monitored end-to-end in a telecommunications network by a monitoring device of a network operator, the server comprising:

a processor; and a memory having stored thereon instructions which, when executed by a processor, perform the method of providing a service by a server of a service provider according to claim 14, wherein the processor is configured to, prior to the provision of service by said service provider, negotiate, with the monitoring device of said network operator over said telecommunications network, a contract including at least one quality parameter of said service, wherein said negotiation occurs prior to the provision of service by said service provider, and wherein the functions that must be provided by the network to satisfy said contract are determined by the monitoring device;

wherein the server is configured to:

in preparation for providing said service, receive a request over said telecommunications network from a terminal to access said service after said component processor has negotiated said contract; and in preparation for providing said service, send the request to the monitoring device after said processor has negotiated said contract, wherein said monitoring device is configured to, on reception of said request, select at least one equipment of said network able to provide said functions and, after selecting said at least one equipment of said network, to set up a path in said network between said terminal and said server via said at least one equipment.

* * * * *